United States Patent
Ichieda

(10) Patent No.: US 10,979,682 B2
(45) Date of Patent: Apr. 13, 2021

(54) PROJECTOR AND METHOD FOR CONTROLLING PROJECTOR

(71) Applicant: SEIKO EPSON CORPORATION, Tokyo (JP)

(72) Inventor: Hiroyuki Ichieda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/452,928

(22) Filed: Jun. 26, 2019

(65) Prior Publication Data

US 2020/0007835 A1  Jan. 2, 2020

(30) Foreign Application Priority Data

Jun. 27, 2018  (JP) .............................. JP2018-122172

(51) Int. Cl.
*H04N 9/31* (2006.01)

(52) U.S. Cl.
CPC ......... *H04N 9/3185* (2013.01); *H04N 9/3191* (2013.01)

(58) Field of Classification Search
CPC ....... H04N 9/31; H04N 9/3185; H04N 9/3191
USPC ................................................. 348/745, 744
See application file for complete search history.

(56) References Cited

U.S. PATENT DOCUMENTS

| 9,396,520 B2 * | 7/2016 | Honda ...................... G06T 3/40 |
| 9,584,782 B2 * | 2/2017 | Watanuki ............. G03B 21/147 |
| 2010/0103330 A1 | 4/2010 | Morrison et al. |

FOREIGN PATENT DOCUMENTS

| JP | 2006-098789 A | 4/2006 |
| JP | 2008-053960 A | 3/2008 |
| JP | 2014-212467 A | 11/2014 |
| JP | 2014-212468 A | 11/2014 |

* cited by examiner

*Primary Examiner* — Trang U Tran
(74) *Attorney, Agent, or Firm* — Oliff PLC

(57) ABSTRACT

A projector includes: a projection unit projecting a projection image onto a projection surface where an object is located, the object defining a projection area where the projection image should be projected; a distortion correction unit correcting a distortion of the projection image; and a projection control unit causing the projection unit to project a guide image showing a range within which a predetermined site of the projection image can move according to the correction of the distortion, the projection control unit thus prompting a user to adjust a positional relation between the object and the range.

18 Claims, 8 Drawing Sheets

PROJECTOR AND METHOD FOR CONTROLLING PROJECTOR

The present application is based on, and claims priority from JP Application Serial Number 2018-122172, filed Jun. 27, 2018, the disclosure of which is hereby incorporated by reference herein in its entirety.

BACKGROUND

1. Technical Field

The present disclosure relates to a projector and a method for controlling a projector.

2. Related Art

When a projector is not directly in front of a projection surface such as a screen, a projection image may become distorted. JP-A-2014-212467 discloses a projector that can correct the distortion of the projection image on the projection surface by distorting the projection image in such a way as to offset the distortion.

When the projector disclosed in JP-A-2014-212467 corrects the distortion, the projection image moves on the projection surface. Therefore, the correction of the distortion may cause a part of the projection image to go out of a planned projection area on the projection surface. Thus, there is a demand for a technique that enables a user to easily adjust one or both of the position of the projection image projected by the projector and the position of the projection area, so that the projection image is maintained within the projection area even when the distortion of the projection image is corrected.

SUMMARY

According to an aspect of the present disclosure, a projector includes: a projection unit projecting a projection image onto a projection surface where an object is located, the object defining a projection area where the projection image should be projected; a distortion correction unit correcting a distortion of the projection image; and a projection control unit causing the projection unit to project a guide image showing a range within which a predetermined site of the projection image can move according to the correction of the distortion.

According to another aspect of the present disclosure, a method for controlling a projector includes: projecting a projection image onto a projection surface where an object is located, the object defining a projection area where the projection image should be projected; and correcting a distortion of the projection image and projecting a guide image showing a range within which a predetermined site of the projection image can move according to the correction of the distortion.

DESCRIPTION OF EXEMPLARY EMBODIMENTS

A: First Embodiment

A1. Outline

Figure 1:
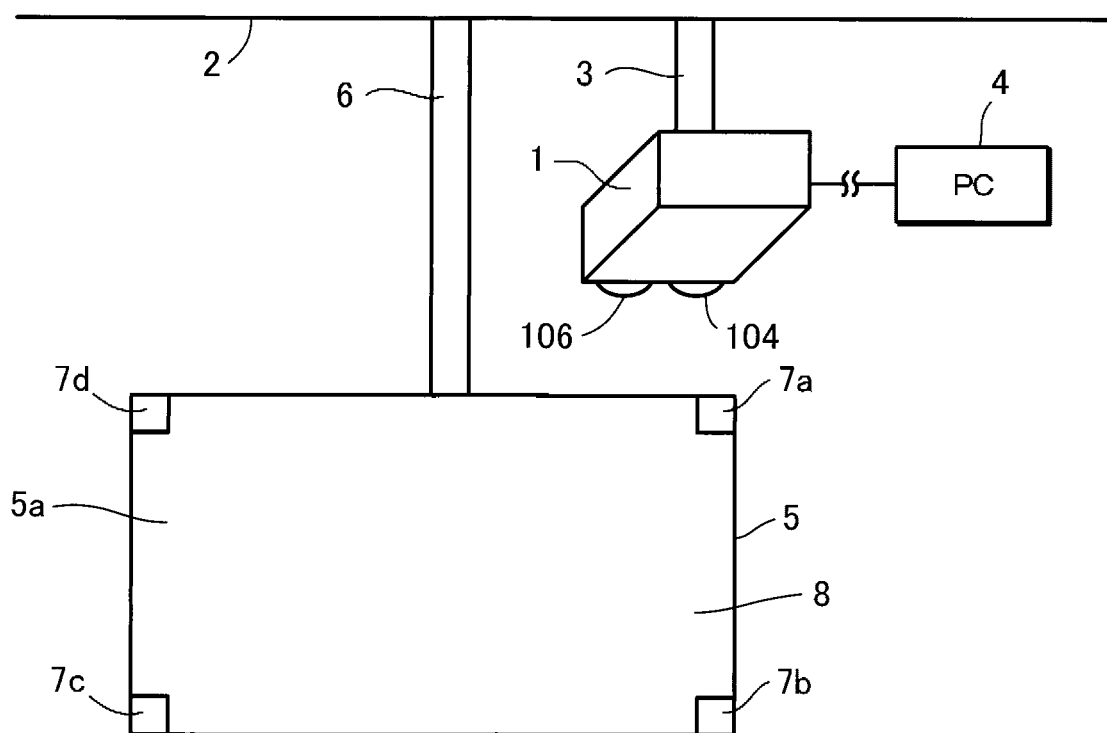
FIG. 1 shows a projector according to a first embodiment.

FIG. 1 shows a projector 1 according to a first embodiment.

The projector 1 is supported by a first support device 3 installed on a ceiling 2. The first support device 3 may be installed on a wall or the like instead of the ceiling 2. The projector 1 is connected to a PC (personal computer) 4, for example, via a wired LAN (local area network), wireless LAN or the like. The connection between the projector 1 and the PC 4 is not limited to via a wired LAN or wireless LAN and can be changed according to need. For example, the projector 1 may be connected to the PC 4 via a USB (universal serial bus) cable, HDMI (high-definition multimedia interface) cable, or VGA (video graphic array) cable. USB is a trademark registered. HDMI is a trademark registered.

The projector 1 receives image information from the PC 4. The PC 4 is an example of an image information providing device. The image information providing device is not limited to the PC 4 and can be changed according to need. For example, the image information providing device may be a DVD (digital versatile disc) player. DVD is a trademark registered. The projector 1 may also receive image information by reading the image information from a recording medium such as a USB memory. The image information received by the projector 1 represents, for example, an advertisement. The image information received by the projector 1 may also represents information that is different from an advertisement, for example, a presentation material.

The projector 1 projects an image generated on a liquid crystal light valve 12, described later, and specifically an image represented by image information, toward a projection surface 5a from a projection unit 104.

Hereinafter, the image generated on the liquid crystal light valve 12 is referred to as a "generated image". The image displayed on the projection surface 5a by the projector 1 projecting the generated image toward the projection surface 5a is referred to as a "projection image". The projection image is an image resulting from the generated image being distorted based on the positional relation between the projector 1 and the projection surface 5a.

The projector 1 can execute keystone correction to correct the distortion of the projection image.

The color of the projection surface 5a is, for example, white. Although the color of the projection surface 5a is not limited to white, it is desirable that the color of the projection surface 5a is similar to white, for example, light gray or cream color, in order to make the projection image more visible. The projection surface 5a is a surface of a projection board 5. The projection surface 5a is not limited to a surface of the projection board 5 and can be changed according to need. The projection surface 5a may be, for example, a screen, wall, blackboard, whiteboard, or door. The projection board 5 is supported by a second support device 6 installed on the ceiling 2. The second support device 6 may be installed on a wall or the like instead of the ceiling 2.

On the projection surface 5a, a first object 7a, a second object 7b, a third object 7c, and a fourth object 7d are attached. Hereinafter, when the first object 7a, the second object 7b, the third object 7c, and the fourth object 7d need not be distinguished from each other, each of the first object 7a, the second object 7b, the third object 7c, and the fourth object 7d is referred to as an "object 7".

The object 7 defines a projection area 8 where the projection image should be projected, on the projection surface 5a. The shape of the projection area 8 is quadrilateral. The four corners of the projection area 8 are defined based on the positions of the four objects 7. In this embodiment, the positions of the four objects 7 form the four corners of the projection area 8. In FIG. 1, the four objects 7 are arranged in the four corners of the projection surface 5a. Therefore, in FIG. 1, the entirety of the projection surface 5a forms the projection area 8.

The object 7 is a retroreflective member. Therefore, the object 7 reflects incident light into the direction of incidence of the light. The light reflection characteristic of the object 7 is different from the light reflection characteristic of the projection surface 5a. Because of this difference in reflection characteristic, the object 7 can be detected, utilizing the difference in contrast between the object 7 and the projection surface 5a.

Other the above example, the object 7 may be any material having a higher reflectance than the projection surface 5a. The object 7 may also be a material which absorbs incident light.

Other than detecting the object 7 utilizing the difference in contrast between the object 7 and the projection surface 5a, the object 7 may be detected utilizing the difference in color tone between the object 7 and the projection surface 5a.

The projector 1 picks up an image of the projection surface 5a, using an image pickup unit 106 provided in the projector 1, and thus generates picked-up image information representing the picked-up image. The projector 1 detects the object 7, based on the picked-up image information.

When the projection image is located in the projection area 8, a part of the projection image becomes incident on the object 7. Therefore, the projector 1 can detect the object 7, based on the picked-up image information. In this embodiment, the projector 1 has the image pickup unit 106. Therefore, the reflected light reflected off the object 7, which is a retroreflective member, can be easily detected, utilizing the difference in contrast.

However, for example, when the attitude of the projector 1 changes due to its own weight or the user moves the object 7, causing at least a part of the projection image to go out of the projection area 8 and thus causing the projection image to be no longer incident on the object 7, the projector 1 can no longer detect the object 7, based on the picked-up image information.

The state where at least a part of the projection image is out of the projection area 8 should not be perceptible.

Thus, the projector 1 controls the brightness of the projection image, based on the result of the detection of the object 7. For example, when one of the four objects 7 is not detected, the projector 1 reduces the brightness of the projection image to less than the brightness of the projection image when the four objects 7 are detected.

A2. Configuration

Figure 2:
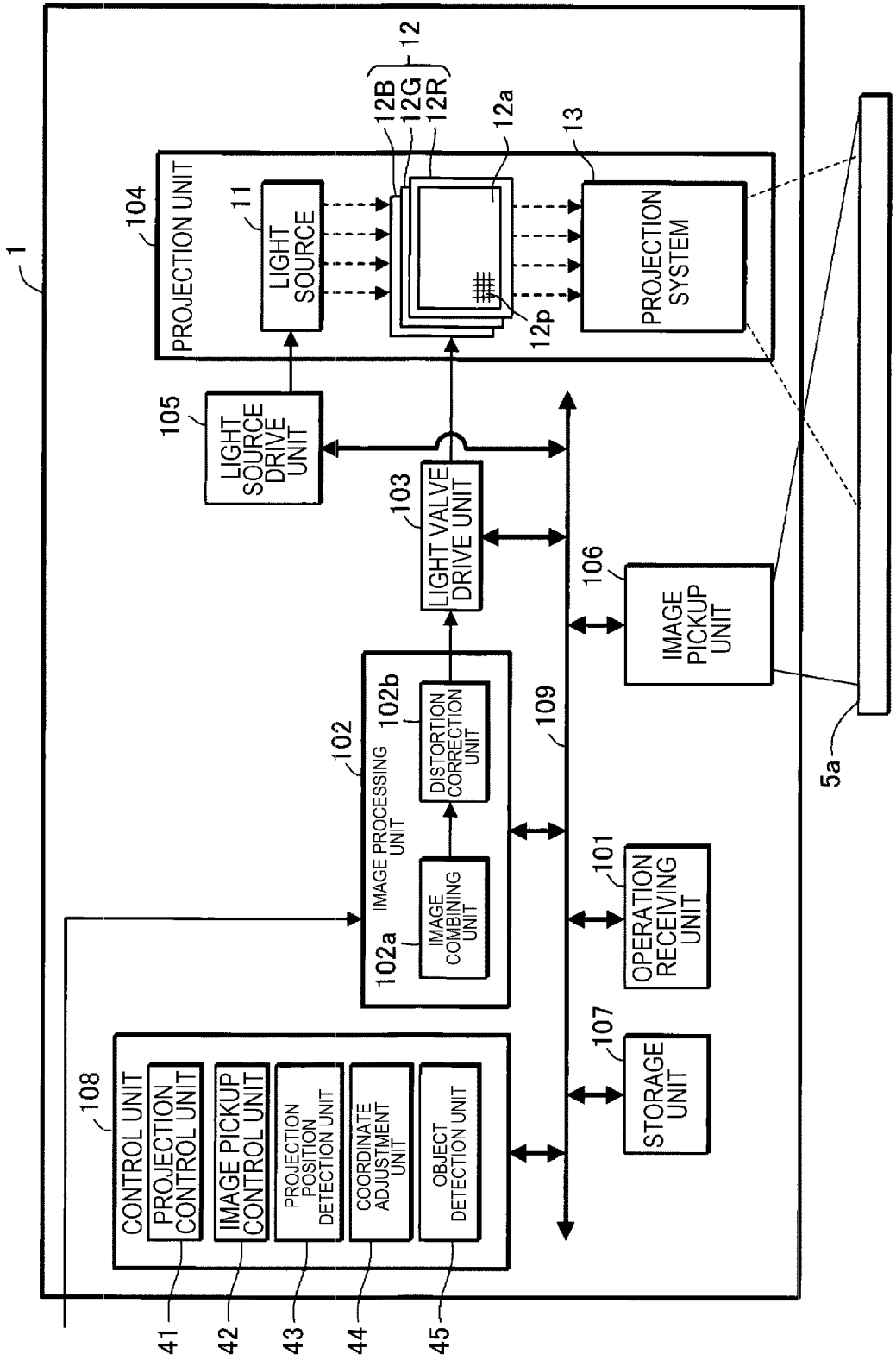
FIG. 2 schematically shows the projector.

FIG. 2 schematically shows the projector 1. The projector 1 includes an operation receiving unit 101, an image processing unit 102, a light valve drive unit 103, a projection unit 104, a light source drive unit 105, the image pickup unit 106, a storage unit 107, a control unit 108, and a bus 109. The image processing unit 102b includes an image combining unit 102a and a distortion correction unit 102b. The projection unit 104 includes a light source 11, a red liquid crystal light valve 12R, a green liquid crystal light valve 12G, a blue liquid crystal light valve 12B, and a projection system 13. Hereinafter, when the red liquid crystal light valve 12R, the green liquid crystal light valve 12G, and the blue liquid crystal light valve 12B need not be distinguished from each other, each of the red liquid crystal light valve 12R, the green liquid crystal light valve 12G, and the blue liquid crystal light valve 12B is simply referred to as a "liquid crystal light valve 12".

The operation receiving unit 101 is, for example, various operation buttons or operation keys, or a touch panel. The operation receiving unit 101 receives an input operation by the user. The operation receiving unit 101 may be a remote controller which transmits information based on an input operation, wirelessly or via a wire. In this case, the projector 1 includes a receiving unit which receives information from the remote controller. The remote controller has various operation buttons or operation keys, or a touch panel, to receive an input operation. The operation receiving unit 101 may also wirelessly accept an operation input to an application operating on an information terminal device such as a smartphone, from the information terminal device.

The image processing unit 102 performs image processing on image information and thus generates an image signal. For example, the image processing unit 102 performs image processing on image information received from the PC 4 or the like and thus generates an image signal. Hereinafter, the image information received by the image processing unit 102 from another device is referred to as "received image information".

The image combining unit 102a combines a plurality of pieces of image information together or outputs a single piece of image information. For example, the image combining unit 102a has an image memory which stores image information. The image combining unit 102a combines together or outputs the image information stored in the image memory. Also, instead of the image combining unit 102a having an image memory, the storage unit 107 may have an image memory. In this case, the image combining unit 102a combines together or outputs image information, using the image memory of the storage unit 107.

In this embodiment, the image combining unit 102a has a first image memory and a second image memory. In the first image memory, for example, received image information is written. In the second image memory, for example, guide image information, projection position detection pattern information, and object detection pattern information are written as alternatives.

Figure 4:
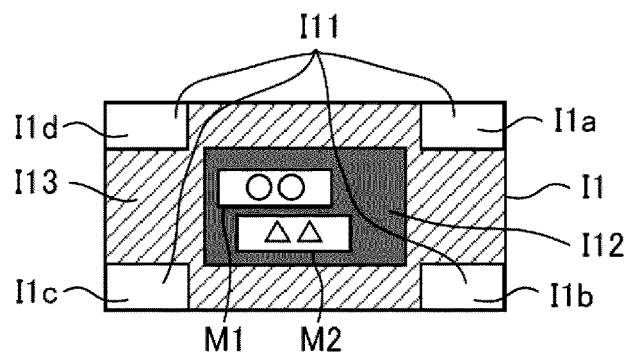
FIG. 4 shows an example of a guide image.

The guide image information represents a guide image I1 to provide guidance on the installation of the projector 1, as shown in FIG. 4. Specifically, the guide image I1 provides guidance to enable the projection image to be projected within the range of the projection area 8 even when keystone correction is executed.

Figure 5:
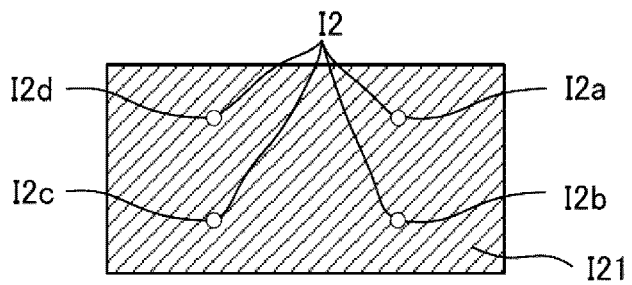
FIG. 5 shows an example of a projection position detection pattern.

The projection position detection pattern information represents a projection position detection pattern I2 to detect a projection position, as shown in FIG. 5. The projection position detection pattern I2 is used for calibration to establish a correspondence between a camera coordinate system and a liquid crystal panel coordinate system. The camera coordinate system is a coordinate system applied to a picked-up image represented by picked-up image information generated by the image pickup unit 106. The liquid crystal panel coordinate system is a coordinate system applied to the liquid crystal light valve 12. The calibration generates a nomography matrix which establishes a correspondence between the camera coordinate system and the liquid crystal panel coordinate system.

Figure 6:
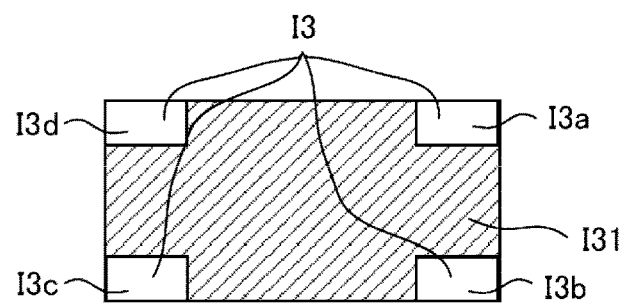
FIG. 6 shows an example of an object detection pattern.

The object detection pattern information represents an object detection pattern I3 to detect the position of the object 7, as shown in FIG. 6.

Each of the received image information, the guide image information, the projection position detection pattern information, and the object detection pattern information is image information.

When image information is not written in the second image memory but image information is written in the first image memory, the image combining unit 102a outputs the image information written in the first image memory.

When image information is not written in the first image memory but image information is written in the second image memory, the image combining unit 102a outputs the image information written in the second image memory.

When image information is written in both the first image memory and the second image memory, the image combining unit 102a first combines together the image information written in the first image memory and the image information written in the second image memory and thus generates combined image information. The image combining unit 102a subsequently outputs the combined image information. The combined image information is image information.

The image combining unit 102a may output one of the image information written in the first image memory and the image information written in the second image memory or may output these pieces of image information as superimposed on each other, for example, in response to an instruction from the control unit 108. Therefore, for example, even in the state where image information is written in the second image memory, the image combining unit 102a can output the image information written in the first image memory, without combining together the image information written in the first image memory and the image information written in the second image memory.

The distortion correction unit 102b executes keystone correction to correct a distortion of the projection image on the projection surface 5a. In this embodiment, the distortion correction unit 102b performs keystone correction onto the image information outputted from the image combining unit 102a and thus generates an image signal.

Specifically, keystone correction is the processing of generating the generated image only in an area on the liquid crystal light valve 12 corresponding to the projection area so that the projection image is projected only in the projection area 8 on the projection surface 5a. The distortion correction unit 102b generates an image signal by processing the image information outputted from the image combining unit 102a in such a way that the image represented by this image information is generated only in the area on the liquid crystal light valve 12 corresponding to the projection area 8.

The light valve drive unit 103 drives the liquid crystal light valve 12, specifically, the red liquid crystal light valve 12R, the green liquid crystal light valve 12G, and the blue liquid crystal light valve 12B, based on the image signal.

The projection unit 104 projects the projection image onto the projection surface 5a. For example, the projection unit 104 projects the projection image onto the projection surface 5a where the object 7 defining the projection area 8 is located.

The light source 11 is, for example, a xenon lamp, ultra-high-pressure mercury lamp, LED (light-emitting diode), or laser light source. The light emitted from the light source 11 is reduced in unevenness of luminance distribution by an optical integration system, not illustrated, and is subsequently separated into color light components of red, green, and blue, which are the primary colors, by a color separation system, not illustrated. Hereinafter, the red is referred to as "R", the green is referred to as "G", and the blue is referred to as "B". The R color light component becomes incident on the red liquid crystal light valve 12R. The G color light component becomes incident on the green liquid crystal light valve 12G. The B color light component becomes incident on the blue liquid crystal light valve 12B.

The liquid crystal light valve 12 is made up of a liquid crystal panel including a pair of transparent substrates with a liquid crystal arranged between them. The liquid crystal light valve 12 has a rectangular pixel area 12a made up of a plurality of pixels 12p arranged into a matrix. In the liquid crystal light valve 12, a drive voltage can be applied to the liquid crystal, pixel 12p by pixel 12p. When the light valve drive unit 103 applies, to each pixel 12p, a drive voltage based on the image signal inputted from the image processing unit 102, each pixel 12p is set to a light transmittance based on the image signal. Therefore, the light emitted from the light source 11 is modulated by being transmitted through the pixel area 12a and thus forms an image based on the image signal for every color light component.

The images of the individual colors are combined together, pixel 12p by pixel 12p, by a light combining system, not illustrated. An image that is a color image is thus generated. This image is enlarged by the projection system 13 and the projection image is projected onto the projection surface 5a.

The light source drive unit 105 drives the light source 11. For example, the light source drive unit 105 causes the light source 11 to emit light, when the operation receiving unit 101 receives an operation input to turn the power on.

The image pickup unit 106 picks up an image of the projection surface 5a and thus generates picked-up image information representing the picked-up image. The image pickup unit 106 includes an optical system such as a lens, and an image pickup element which converts light condensed by the optical system into an electrical signal. The image pickup element is, for example, a CCD (chargecoupled device) image sensor or CMOS (complementary metal-oxide semiconductor) image sensor. The image pickup unit 106 repeatedly picks up an image of the projection surface 5*a* and thus generates picked-up image information in time series.

The storage unit 107 is a computer-readable recording medium. The storage unit 107 stores a program prescribing operations of the projector 1, and various kinds of information.

The control unit 108 is a computer such as a CPU (central processing unit). The control unit 108 reads and executes a program stored in the storage unit 107 and thus implements a projection control unit 41, an image pickup control unit 42, a projection position detection unit 43, a coordinate adjustment unit 44, and an object detection unit 45.

The projection control unit 41 controls the image processing unit 102 and the light source drive unit 105 and thus controls the projection image projected by the projection unit 104. The projection control unit 41 causes the projection unit 104 to project, for example, the guide image I1 to provide guidance on the installation of the projector 1, the projection position detection pattern I2, and the object detection pattern I3.

When the guide image I1 is projected on the projection surface 5*a*, the user adjusts one or both of the position of the projector 1 and the position of the projection area 8 according to the guide image I1. This adjustment is made in order to place the projection image within the projection area 8 even when keystone correction is executed. The adjustment allows the projector 1 to project the projection image after the execution of keystone correction, within the range of the projection area 8.

When the projection position detection pattern I2 is projected on the projection surface 5*a*, and when the object detection pattern I3 is projected on the projection surface 5*a*, the image pickup unit 106 executes image pickup.

The image pickup control unit 42 controls the image pickup unit 106 and causes the image pickup unit 106 to generate picked-up image information. For example, the image pickup control unit 42 causes the image pickup unit 106 to generate picked-up image information in the state where the projection position detection pattern I2 is projected on the projection surface 5*a*. Also, the image pickup control unit 42 causes the image pickup unit 106 to generate picked-up image information in the state where the object detection pattern I3 is projected on the projection surface 5*a*.

The projection position detection unit 43 detects the projection position detection pattern I2, based on the picked-up image information generated by the image pickup unit 106 picking up an image of the projection position detection pattern I2 on the projection surface 5*a*. Hereinafter, the picked-up image information generated by the image pickup unit 106 picking up an image of the projection position detection pattern I2 on the projection surface 5*a* is referred to as "first picked-up image information".

The coordinate adjustment unit 44 generates a nomography matrix, using the result of the detection of the projection position detection pattern I2, more specifically, the position of the projection position detection pattern I2 on the liquid crystal panel coordinate system and the position of the projection position detection pattern I2 on the camera coordinate system. The coordinate adjustment unit 44 stores the homography matrix into the storage unit 107.

When a distortion of the lens of the image pickup unit 106 has an influence on the camera coordinate system, the coordinate adjustment unit 44 may generate a homography matrix, using the position of the projection position detection pattern I2 on the liquid crystal light valve 12, to which the liquid crystal panel coordinate system is applied, and the position of the projection position detection pattern I2 on a standard coordinate system resulting from correcting the influence on the camera coordinate system of the distortion of the lens of the image pickup unit 106.

The projection position detection pattern I2 may be made up of four dot patterns. The projection unit 104 may project four or more dot patterns I2*a* to I2*d* near the position of the object 7, as shown in FIG. 5. The coordinate adjustment unit 44 may generate, for every object 7, a homography matrix, using the four or more dot patterns I2*a* to I2*d* near the position of the object 7. In this case, the influence of the distortion of the lens of the image pickup unit 106 can be reduced locally.

The object detection unit 45 detects the object 7, based on the picked-up image information generated by the image pickup unit 106 picking up an image of the object detection pattern I3 on the projection surface 5*a*. For example, the object detection unit 45 detects the position of the object 7, based on the picked-up image information. Hereinafter, the picked-up image information generated by the image pickup unit 106 picking up an image of the object detection pattern I3 on the projection surface 5*a* is referred to as "second picked-up image information".

When the user adjusts one or both of the position of the projector 1 and the position of the projection area 8 according to the guide image and thus enables the projection image to be placed within the projection area 8 even when keystone correction is executed, the object detection unit 45 can detect the object 7.

However, it is conceivable that the attitude of the projector 1 gradually changes, for example, due to its own weight after the adjustment and that the projection image may not be able to be placed within the projection area 8 even when keystone correction is executed. For example, the area where the projection image is not projected in the projection area 8 may increase or the part of the projection image projected outside the projection area 8 may increase. In this state, the keystone-corrected projection image is not placed within the projection area 8. It is not preferable that this state is perceptible. Also, in this state, the object detection unit 45 cannot detect the object 7.

Thus, the projection control unit 41 controls the brightness of the projection image, based on the result of the detection by the object detection unit 45, that is, the result of the detection of the object 7. For example, when the result of the detection of the object 7 satisfies a condition that the object 7 is not detected, the projection control unit 41 reduces the brightness to less than the brightness of the projection image projected by the projection unit 104 when the result of the detection of the object 7 does not satisfy the condition that the object 7 is not detected. The condition that the object 7 is not detected is an example of a first condition.

The bus 109 couples together the operation receiving unit 101, the image processing unit 102, the light valve drive unit 103, the light source drive unit 105, the image pickup unit 106, the storage unit 107, and the control unit 108.

A3. Keystone Correction

Figure 3:
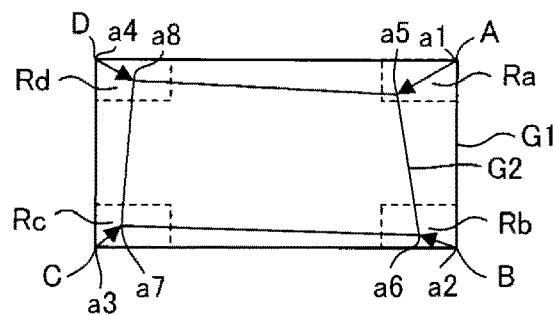
FIG. 3 explains an example of keystone correction.

FIG. 3 explains an example of keystone correction and shows an image generated on the liquid crystal light valve 12. The distortion correction unit 102*b* moves each of a first corner A, a second corner B, a third corner C, and a fourth corner D forming the four corners of a first image G1 represented by image information, separately from each other in response to the operation input received by the operation receiving unit 101, and thus executes keystone correction and generates a second image G2. Each of the first image G1 and the second image G2 is an example of the generated image. In the example shown in FIG. 3, the distortion correction unit 102b moves the first corner A from a first position a1 to a fifth position a5, moves the second corner B from a second position a2 to a sixth position a6, moves the third corner C from a third position a3 to a seventh position a7, and moves the fourth corner D from a fourth position a4 to an eighth position a8. When the projection image resulting from projecting the first image G1 toward the projection surface 5a has a keystone distortion, the projector 1 can execute keystone correction of the projection image by projecting the second image G2.

FIG. 3 shows a first range Ra, a second range Rb, a third range Rc, and a fourth range Rd.

The first range Ra is a range within which the first corner A can move according to keystone correction. In other words, the distortion correction unit 102b moves the first corner A within the first range Ra.

The second range Rb is a range within which the second corner B can move according to keystone correction. In other words, the distortion correction unit 102b moves the second corner B within the second range Rb.

The third range Rc is a range within which the third corner C can move according to keystone correction. In other words, the distortion correction unit 102b moves the third corner C within the third range Rc.

The fourth range Rd is a range within which the fourth corner D can move according to keystone correction. In other words, the distortion correction unit 102b moves the fourth corner D within the fourth range Rd.

A4. Image

An example of the various kinds of information stored in the storage unit 107 will now be descried.

The various kinds of information are, for example, image information used by the image combining unit 102a. The image information used by the image combining unit 102a is, for example, guide image information, projection position detection pattern information, and object detection pattern information. The guide image information, the projection position detection pattern information, and the object detection pattern information may be generated by the control unit 108 instead of being stored in the storage unit 107 in advance. The guide image information, the projection position detection pattern information, and the object detection pattern information will now be described.

FIG. 4 shows an example of the guide image I1 based on the guide image information. The guide image I1 has a first area I11 and a second area I12. The guide image I1 in this embodiment includes a first background 113 shown as a hatched part in FIG. 4 and its color is, for example, black. The color of the first background 113 is not limited to black and may be any color that is different from both the color of the first area I11 and the color of the second area I12.

The first area I11 represents the range within which the four corners of the projection image, that is, the first corner A, the second corner B, the third corner C, and the fourth corner D, can move according to the correction of the distortion by the distortion correction unit 102b. The first area I11 is shown, for example, in white. The four corners of the projection image are an example of the "predetermined site of the projection image".

The first area I11 has a top right area I1a, a bottom right area I1b, a bottom left area I1c, and a top left area I1d. The top right area I1a represents the range within which the first corner A can move according to the correction of the distortion by the distortion correction unit 102b. The bottom right area I1b represents the range within which the second corner B can move according to the correction of the distortion by the distortion correction unit 102b. The bottom left area I1c represents the range within which the third corner C can move according to the correction of the distortion by the distortion correction unit 102b. The top left area I1d represents the range within which the fourth corner D can move according to the correction of the distortion by the distortion correction unit 102b.

The positional relation between the top right area I1a, the bottom right area I1b, the bottom left area I1c, and the top left area I1d in the guide image I1 is similar to the positional relation between the first to fourth ranges Ra to Rd in the first image G1 shown in FIG. 3.

The shape of each of the top right area I1a, the bottom right area I1b, the bottom left area I1c, and the top left area I1d is, for example, rectangular. The shape of each of the top right area I1a, the bottom right area I1b, the bottom left area I1c, and the top left area I1d is not limited to rectangular and can be changed properly according to the keystone correction carried out by the distortion correction unit 102b.

The second area 112 represents the area where the projection position detection pattern I2 is projected. The second area 112 is shown, for example, in white. The shape of the second area 112 is, for example, rectangular. The shape of the second area 112 is not limited to rectangular and can be change according to need.

The guide image I1 also shows a first message M1 prompting the user to adjust one or both of the position of the guide image I1 and the position of the object 7 so that the object 7 is located in the first area I11. When the shape of each of the top right area I1a, the bottom right area I1b, the bottom left area I1c, and the top left area I1d is rectangular, for example, a message "Adjust the projection position in such a way that the object is placed within the white rectangles in the four corners of the projection area" is used as the first message M1. The first message M1 can be changed according to need, provided that the message prompts the user to locate the object 7 in the first area I11. The first message M1 may be shown in the second area 112 or in the first background 113.

The guide image I1 also shows a second message M2 prompting the user to locate the second area 112 in the projection area 8. When the shape of the second area 112 is rectangular, for example, a message "Adjust the projection position in such a way that the rectangular area in the center of the projection image is placed within the projection surface" is used as the second message M2. The second message M2 can be changed according to need, provided that the message prompts the user to locate the second area 112 in the projection area 8. The second message M2 may be shown in the second area 112 or in the first background 113.

FIG. 5 shows an example of the projection position detection pattern I2 based on the projection position detection pattern information. The projection position detection pattern I2 has white dot patterns I2a to I2d shown on a black second background 121. The color of the second background 121 is not limited to black and may be any color that is different from the color of the dot patterns I2a to I2d. The color of the dot patterns I2a to I2d is not limited to white and may be any color that is different from the color of the second background 121. The projection position detection pattern I2, more specifically, the dot patterns I2a to I2d are used to generate a nomography matrix. The luminance distribution in each of the dot patterns I2a to I2d is, for example, the Gaussian distribution. The luminance distribution of the dot pattern is not limited to a luminance distribution with gradation such as the Gaussian distribution and may be a luminance distribution without gradation. The shape of the dot pattern may be preferably circular but may also be rectangular.

FIG. 6 shows an example of the object detection pattern I3 based on the object detection pattern information. The object detection pattern I3 has white patterns I3a to I3d shown on a black third background 131. The color of the third background 131 is not limited to black and may be any color that is different from the color of the patterns I3a to I3d. The color of the patterns I3a to I3d is not limited to white and may be any color that is different from the color of the third background 131. The object detection pattern I3 is used to detect the object 7.

The positional relation between the patterns I3a to I3d is similar to the positional relation between the top right area I1a, the bottom right area I1b, the bottom left area I1c, and the top left area I1d in the guide image I1 shown in FIG. 4. Therefore, when the position of the object detection pattern I3 is set according to the guide image I1, the pattern I3a is cast onto the first object 7a, the pattern I3b is cast onto the second object 7b, the pattern I3c is cast onto the third object 7c, and the pattern I3d is cast onto the fourth object 7d.

The color of the top right area I1a, the bottom right area I1b, the bottom left area I1c, and the top left area I1d shown in FIG. 4 and the color of the patterns I3a to I3d shown in FIG. 6 may be the same or different from each other.

It is preferable that the color of the dot patterns I2a to I2d shown in FIG. 5 and the color of the patterns I3a to I3d shown in FIG. 6 are the same. When a distortion of the lens of the image pickup unit 106 is corrected on the camera coordinate system, it is desirable that the color of the dot patterns I2a to I2d shown in FIG. 5 and the patterns I3a to I3d shown in FIG. 6 is similar to the wavelength component of a parameter used to correct the distortion of the lens of the image pickup unit 106. In this case, for example, it is desirable that the color of the patterns shown in FIGS. 5 and 6 is green instead of white.

A5. Operation

An operation will now be described.

Figure 7:
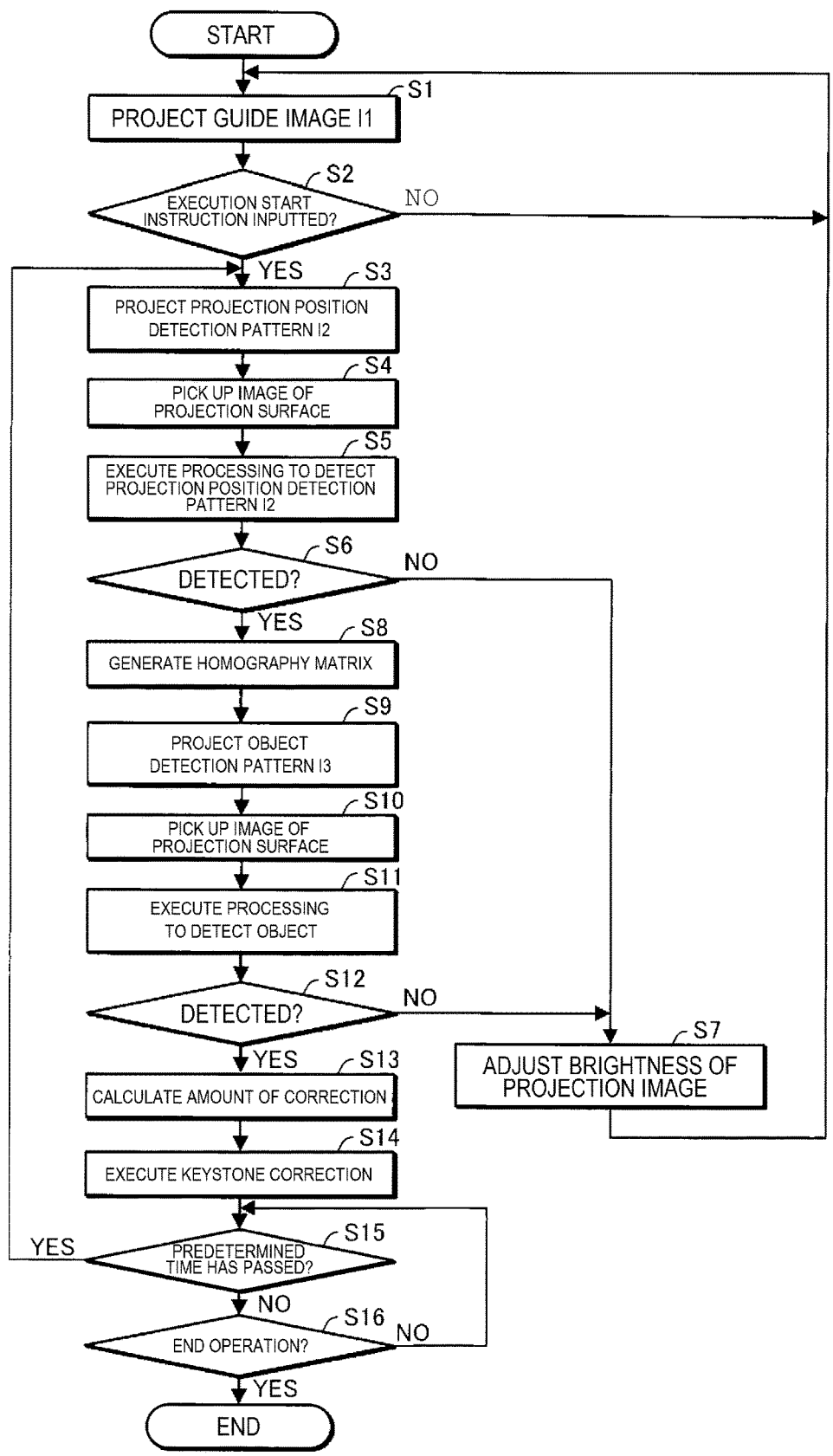
FIG. 7 is a flowchart for explaining an operation of the projector.

FIG. 7 is a flowchart for explaining an operation of the projector 1.

First, a prior stage before starting the operation shown in FIG. 7 will be described.

Figure 8:
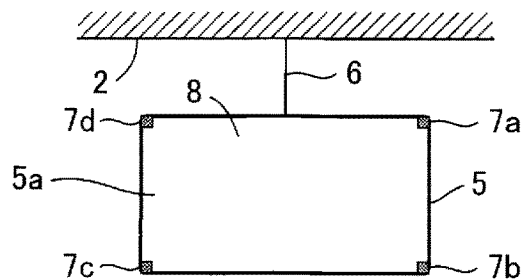
FIG. 8 shows an example of a projection surface.

As shown in FIG. 8, the projection board 5 having one object 7 located in each of the four corners of the projection surface 5a is suspended from the ceiling 2 via the second support device 6. Since one object 7 is located in each of the four corners of the projection surface 5a, the entirety of the projection surface 5a is the projection area 8.

Subsequently, the user operates the operation receiving unit 101 and thus turns on the power of the projector 1. When the power of the projection 1 is turned on, the projection control unit 41 controls the light source drive unit 105 and thus turns on the light source 11.

Subsequently, the user operates the operation receiving unit 101 to input an adjustment start instruction to start automatic adjustment of the shape of the projection image. When the adjustment start instruction is inputted, the projection control unit 41 reads guide image information from the storage unit 107 and writes the guide image information into the second image memory. The projection control unit 41 then sets the amount of correction for keystone correction by the distortion correction unit 102b to zero. Whichever of the processing of writing the guide image information into the second image memory and the processing of setting the amount of correction for keystone correction to zero may come first in order. Subsequently, the image processing unit 102 generates an image signal based on the guide image information. The processing up to this point is the prior stage before starting the operation shown in FIG. 7.

On completion of the prior stage, the projection unit 104 in step S1 shown in FIG. 7 projects the guide image I1 corresponding to FIG. 4 onto the projection surface 5a in response to the image signal.

Figure 9:
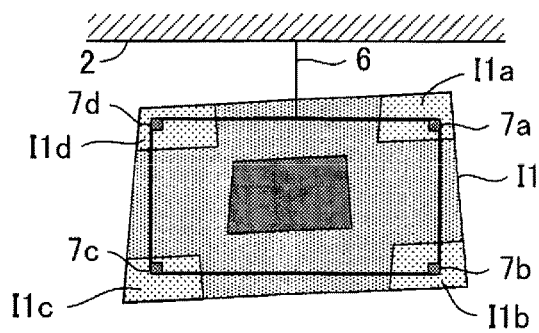
FIG. 9 shows an example of projection of the guide image.

FIG. 9 shows an example of the projection of the guide image I1 in step S1. In the example shown in FIG. 9, a keystone distortion occurs in the guide image I1, due to the relative positional relation between the projector 1 and the projection surface 5a, or the like.

The user, prompted by the guide image I1 projected in step S1, for example, by the first message M1 and the second message M2, manually adjusts the direction or position of the projector 1 or the position of the object 7. For example, the user manually adjusts the direction or position of the projector 1 or the position of the object 7 in such a way that the first object 7a is located in the top right area I1a, the second object 7b is located in the bottom right area I1b, the third object 7c is located in the bottom left area I1c, and the fourth object 7d is located in the top left area I1d. FIG. 9 shows the state where the manual adjustment is complete.

After finishing the manual adjustment according to the guide image I1 projected in step S1, the user operates the operation receiving unit 101 to input an execution start instruction to start execution of automatic adjustment of the shape of the projection image.

In the projector 1, the operation receiving unit 101 receives the execution start instruction in step S2 and then projection control unit 41 reads projection position detection pattern information from the storage unit 107 and writes the projection position detection pattern information into the second image memory. The image processing unit 102 generates an image signal based on the projection position detection pattern information.

When the operation receiving unit 101 does not receive the execution start instruction within a prescribed time in step S2, the processing may return to step S1, may return to the beginning of step S2, or may end.

Figure 10:
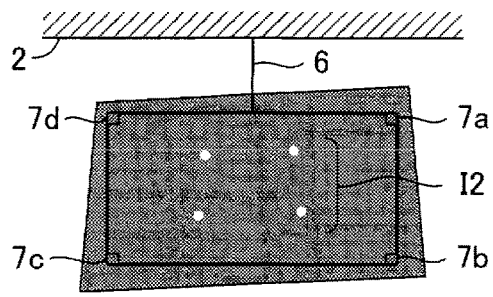
FIG. 10 shows an example of projection of the projection position detection pattern.

After the image processing unit 102 generates the image signal based on the projection position detection pattern information, the projection unit 104 in step S3 projects the projection position detection pattern I2 corresponding to FIG. 5 onto the projection surface 5a in response to the image signal based on the projection position detection pattern information. FIG. 10 shows an example of the projection of the projection position detection pattern I2 in step S3.

Subsequently, in step S4, the image pickup control unit 42 causes the image pickup unit 106 to pick up an image of the projection surface 5a. The image pickup unit 106 picks up an image of the projection surface 5a where the projection position detection pattern I2 is projected, and thus generates the first picked-up image information.

In step S4, for example, the image pickup control unit 42 adjusts the exposure of the image pickup unit 106 and then causes the image pickup unit 106 to pick up an image of the projection surface 5a so that the maximum luminance of the dot pattern included in the first picked-up image information falls within a predetermined range.

Subsequently, in step S5, the projection position detection unit 43 executes processing to detect the projection position detection pattern I2 from the picked-up image represented by the first picked-up image information. The projection position detection unit 43 may execute processing to detect the projection position detection pattern I2, using the difference between picked-up image information generated by the image pickup unit 106 set to the exposure value for generating the first picked-up image in the state where the projection unit 104 projects an entirely black image, and the first picked-up image information. In this case, the ambient light can be restrained from influencing the detection of the projection position detection pattern I2.

In step S5, the projection position detection unit 43 detects, for example, a part having a luminance higher than a part having the lowest luminance by a first threshold value or more, of the picked-up image, as the projection position detection pattern I2. Hereinafter, each of the parts having a luminance higher than the part having the lowest luminance by the first threshold value or more, of the picked-up image, is referred to as a "dot pattern part".

For example, in step S5, the projection position detection unit 43 detects the centroid positions of the dot pattern parts as the positions of the dot patterns I2a to I2d.

The projection position detection unit 43 may detect the centroid position of the dot pattern part, using the luminance distribution in the dot pattern part as well. For example, the projection position detection unit 43 weights each pixel forming the dot pattern part, based on the luminance of the pixel, and detects the centroid position of the weighted dot pattern part.

Subsequently, when the projection position detection pattern I2 is not detected in step S6, the projection control unit 41 adjusts the brightness of the projection image in step S7 shown in FIG. 7. For example, when one of the dot patterns I2a to I2d forming the projection position detection pattern I2 is not detected, the projection control unit 41 executes step S7.

In step S7, the projection control unit 41, for example, reduces the brightness of the projection image from the current brightness.

As an example, in step S7, assuming that the brightness of the projection image when the projection position detection pattern I2 is detected is 100%, the projection control unit 41 reduces the brightness of the projection image to a brightness lower than 100%. For example, in step S7, the projection control unit 41 reduces the brightness of the projection image to 30%. The brightness lower than 100% is not limited to 30%. For example, the brightness lower than 100% may be 0%. Here, the brightness of 0% means that the projection image is entirely black. When step S7 ends, the processing returns to step S1.

Meanwhile, when the projection position detection pattern I2 is detected in step S6, the coordinate adjustment unit 44 in step S8 calculates a homography matrix for converting the camera coordinate system into the liquid crystal panel coordinate system, based on the positional relation between the centroid coordinates of each of the dot patterns I2a to I2d specified by the projection position detection pattern information and the centroid coordinates of each of the dot patterns I2a to I2d in the picked-up image.

The coordinate adjustment unit 44 then stores the homography matrix in the storage unit 107. As the projection position detection pattern I2, a pattern showing two straight lines crossing each other may be used instead of the dot patterns I2a to I2d, and a homography matrix may be calculated based on the positions of the two straight lines. Also, a checker pattern may be used.

Figure 11:
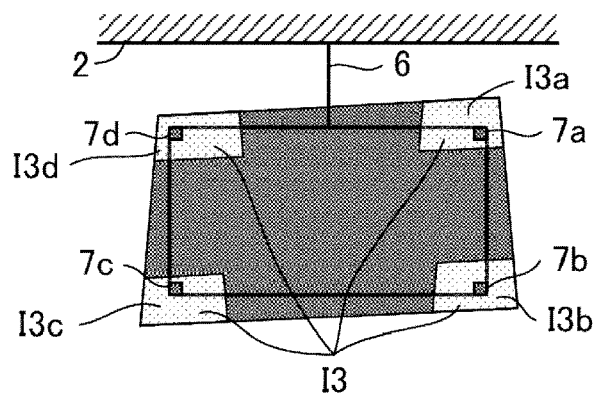
FIG. 11 shows an example of projection of the object detection pattern.

Subsequently, the projection control unit 41 reads an object detection pattern information from the storage unit 107 and writes the object detection pattern information into the second image memory. The image processing unit 102 generates an image signal based on the object detection pattern information. Then, in step S9, the projection unit 104 projects the object detection pattern I3 onto the projection surface 5a in response to the image signal. FIG. 11 shows an example of the projection of the object detection pattern I3 in step S9. The object detection pattern I3 corresponds to FIG. 6.

The object detection pattern I3 is used to detect the light reflected off the object 7. In this embodiment, a white image is used as the object detection pattern I3 in order to facilitate the detection of the light reflected off the object 7.

Subsequently, in step S10, the image pickup control unit 42 causes the image pickup unit 106 to pick up an image of the projection surface 5a. The image pickup unit 106 picks up an image of the projection surface 5a where the object detection pattern I3 is projected, and thus generates the second picked-up image information.

In step S10, similarly to the image pickup of the projection position detection pattern, the image pickup control unit 42 adjusts the exposure of the image pickup unit 106 and then causes the image pickup unit 106 to pick up an image of the projection surface 5a so that the luminance of the white rectangular part of the object detection pattern I3 represented by the second picked-up image information falls within a predetermined range.

In this embodiment, a retroreflective member is used as the object 7. Therefore, when light of the object detection pattern I3 is cast from the projector 1, the object 7 reflects this light toward the image pickup unit 106 of the projector 1. Thus, on the picked-up image, the object 7 has a higher luminance than its surroundings.

When the image pickup unit 106 generates the first picked-up image information, the object detection unit 45 in step S11 first detects an area having a higher luminance than its surroundings on the picked-up image as an object presence area where the object 7 is present, and detects the centroid position of the object presence area as the centroid position of the object 7, for every object presence area.

It is desirable that the object 7 has such a shape and reflection characteristic that a high accuracy of detection of the centroid position is achieved. For example, it is desirable that the object 7 is circular as viewed in a plan view and has a higher reflectance as it goes closer to the centroid position, as a reflection characteristic.

The object detection unit 45 may also execute the processing to detect the object 7, using the difference between the picked-up image information generated by the image pickup unit 106 set to the exposure value for the generation of the second picked-up image in the state where the projection unit 104 projects the entirely black image, and the second picked-up image information. In this case, the ambient light can be restrained from influencing the detection of the object 7.

The position of the object 7 is not limited to the centroid position of the object 7 and can be changed according to need. For example, when the object 7 is polygonal, for example, quadrilateral or L-shaped, a vertex, edge or corner of the object 7 may be used as the position of the object 7. When the object 7 is a solid figure having a certain thickness, the object detection unit 45 may find the position of the object 7, taking into account the amount of offset corresponding to the thickness.

Subsequently, when the object 7, more specifically, the centroid position of the object 7, is not detected in step S12, step S7 is executed.

Meanwhile, when the object 7, more specifically, the centroid position of the object 7, is detected in step S12, the coordinate adjustment unit 44 in step S13 calculates position information representing the position of a projection range on the liquid crystal panel coordinate system, as the amount of correction for keystone correction by the distortion correction unit 102b.

The projection range is a range where the image projected in the entire area or a part of the area of the projection area 8 defined by the four objects 7 on the projection surface 5a, that is, the generated image, is generated, in the pixel area 12a on the liquid crystal light valve 12 (see FIG. 2). Hereinafter, the area where the generated image projected in the entire area of the projection area 8 defined by the four objects 7 is generated, in the pixel area 12a, is referred to as a "specified area".

In step S13, the coordinate adjustment unit 44 converts the position of the object 7 on the picked-up image where the camera coordinate system is employed, into a coordinate position on the liquid crystal panel coordinate system, using the nomography matrix. The coordinate adjustment unit 44 then decides, for example, a quadrilateral area whose vertices defined by the positions of the four objects 7 on the liquid crystal light valve 12, that is, a specified area, as the projection range.

The coordinate adjustment unit 44 may also calculate the projection range in such a way that the outer edge of the generated image is located further on the inner side than the outer edge of the specified area.

For example, the coordinate adjustment unit 44 first generates a homography matrix for keystone correction to convert the positions of the four corners of the pixel area 12a on the liquid crystal panel coordinate system into the positions of the four corners of the specified area on the liquid crystal panel coordinate system. Then, for each of the positions of the four corners of the pixel area 12a on the liquid crystal panel coordinate system, the coordinate adjustment unit 44 calculates a correction position away from the position of the corner toward the center position of the pixel area 12a by a predetermined amount of offset. The coordinate adjustment unit 44 then converts the correction positions of the respective positions of the four corners of the pixel area 12a into the positions of the four corners of the projection range included in the specified area, using the homography matrix for keystone correction.

The method for calculating the projection range included in the specified area is not limited to the foregoing method and can be changed according to need. For example, a reduction operation to reduce the magnification of the specified area in order to set the projection range included in the specified area may be executable, using an OSD (on-screen display) menu. The reduction operation may be carried out via a remote controller.

The coordinate adjustment unit 44 then sets the position information of the projection range in the distortion correction unit 102b.

Figure 12:
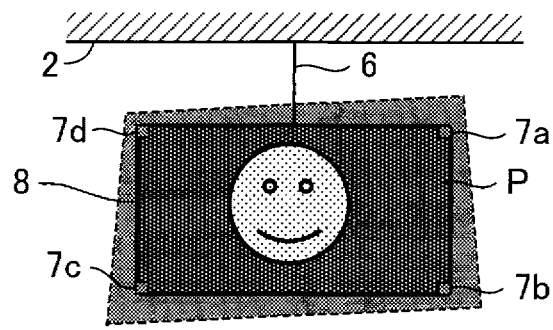
FIG. 12 shows an example of projection of a projection image.

Subsequently, in step S14, as the position information of the projection range is set, the distortion correction unit 102b executes keystone correction onto the output from the image combining unit 102a, based on this position information. Thus, for example, a projection image P is projected as the keystone-corrected projection image in the projection area 8 defined by the position of the object 7, as shown in FIG. 12. In the example shown in FIG. 12, keystone correction is carried out in such away that the outer edge of the projection area P coincides with the outer edge of the projection area 8.

Also, the coordinate adjustment unit 44 in step S12 may calculate the amount of correction to place the projection image within the projection area 8 while maintaining the aspect ratio of the projection image based on the image information.

Figure 13:
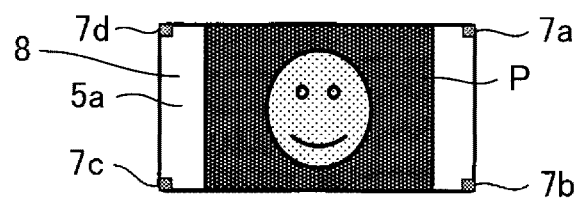
FIG. 13 shows another example of projection of the projection image.
Figure 14:
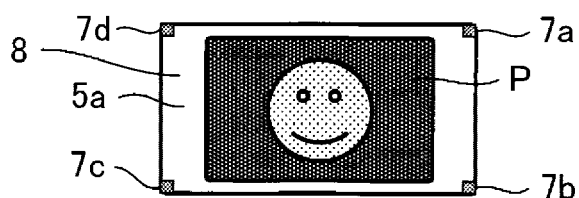
FIG. 14 shows still another example of projection of the projection image.

For example, the coordinate adjustment unit 44 calculates the amount of correction in such a way that the entirety of the projection image P is within the projection area 8 and that the area where the projection image P is not present, in the projection area 8, is displayed in black, as shown in FIG. 13 or 14. In this case, the aspect ratio of the projection image P can be restrained from varying.

It is desirable that the user can select a setting about what kind of projection image P is to be arranged in the projection area 8, by a menu operation or the like before or after the start of automatic adjustment of the projection position.

Figure 15:
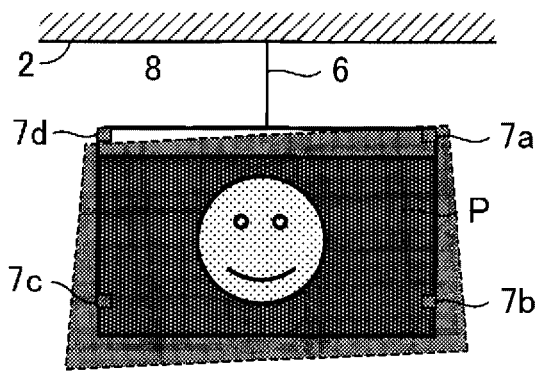
FIG. 15 shows an example of the projection image whose projection position is shifted.

After the execution of step S14, the attitude of the projector 1 may change due to its own weight, as described above. In this case, the projection image P goes out of the projection area 8, for example, as shown in FIG. 15.

Thus, in this embodiment, when, in step S15, a predetermined time has passed from the completion of step S14, the processing is executed from step S3.

When the projection position detection pattern I2 or the object 7 is not detected due to the projection image P being out of the projection area 8, the brightness of the projection image P is reduced in step S7. When the projection position detection pattern I2 and the object 7 are detected even though the attitude of the projector 1 is changed, keystone correction is carried out and the projection image P is projected within the range of the projection area 8.

Figure 16:
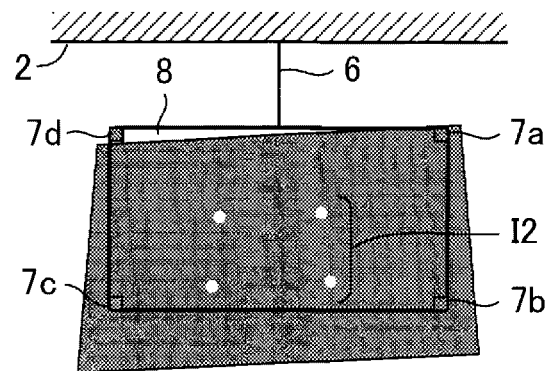
FIG. 16 shows another example of projection of the projection position detection pattern.

FIG. 16 shows an example of the projection of the projection position detection pattern I2 in step S3 in the state where the projection image P is out of the projection area 8. In the state shown in FIG. 16, the projection position detection pattern I2 is detected and therefore step S7 is not executed.

Figure 17:
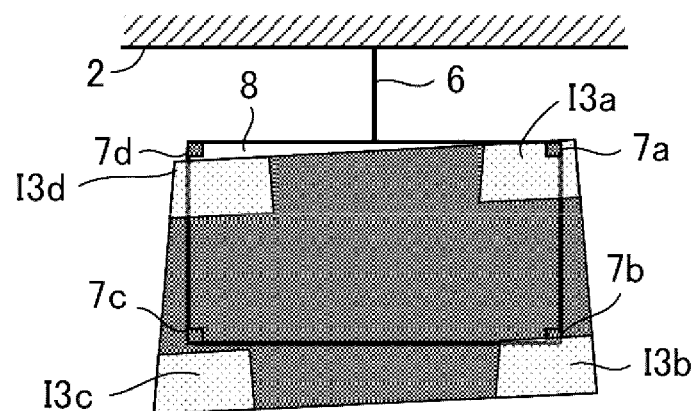
FIG. 17 shows another example of projection of the object detection pattern.

FIG. 17 shows an example of the projection of the object detection pattern I3 in step S9 in the state where the projection image P is out of the projection area 8. In the state shown in FIG. 17, the fourth object 7d is not detected and therefore step S7 is executed.

Figure 18:
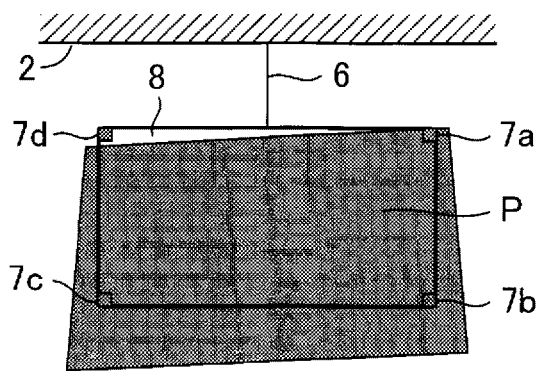
FIG. 18 shows an example of the projection image.

FIG. 18 shows an example of the projection image P having a brightness of 0% in step S7. In the state shown in FIG. 18, it is less perceptible that at least a part of the projection image P is out of the projection area 8.

A6. Overview

In the projector 1 and the method for controlling the projector 1 according to this embodiment, the projection unit 104 projects the projection image P onto the projection surface 5a where the object 7 is located, the object 7 defining the projection area 8 where the projection image P should be projected. The image pickup unit 106 picks up an image of the projection surface 5a and thus generates a picked-up image. The object detection unit 45 detects the object 7, based on the picked-up image generated by the image pickup unit 106. The projection control unit 41 controls the brightness of the projection image, based on the result of the detection of the object 7 detected by the object detection unit 45.

The position of the object 7 on the picked-up image changes according to the positional relation between the projector 1 and the projection surface 5a. Therefore, the result of the detection of the object 7 on the picked-up image reflects that a part of the projection image P is out of the projection area 8, due to the change in the position of the projection image P with respect to the projection surface 5a.

Thus, controlling the brightness of the projection image P based on the result of the detection of the object 7 can make it less perceptible that a part of the projection image P is out of the projection area 8.

When the result of the detection of the object 7 satisfies the first condition, the projection control unit 41 may reduce the brightness of the projection image P to lower than the brightness of the projection image P when the result of the detection of the object 7 does not satisfy the first condition.

In this case, the brightness of the projection image P can be adjusted according to whether the result of the detection of the object 7 reflecting that a part of the projection image P is out of the projection area 8 satisfies the first condition or not.

As the first condition, a condition that the object 7 is not detected may be used.

The object 7 defines the projection area 8. Therefore, when the object 7 is not detected, a part of the projection image P may be out of the projection area 8. Thus, in the case where the condition that the object 7 is not detected is used as the first condition, the projection image can be darkened when a part of the projection image P is out of the projection area 8.

The object detection unit 45 may detect the position of the object 7, based on the picked-up image information. In this case, a condition that the object 7 is located outside the first range may be used as the first condition.

In this case, when the object 7 is located outside the first range because a part of the projection image P is out of the projection area 8, the projection image P can be darkened.

The distortion correction unit 102b corrects a distortion of the projection image P. The first range may be a range where the four corners of the projection image can move in response to the correction of the distortion.

In this case, when the projection image P is not located in the projection area 8 due to the correction of the distortion of the projection image P, the projection image P can be darkened.

The projection unit 104 may project the object detection pattern I3 for detecting the object 7. The object detection unit 45 may detect the object 7, based on picked-up image information generated by the image pickup unit 106 picking up an image of the projection surface 5a where the projection unit 104 projects the object detection pattern I3.

In this case, the object 7 can be detected more easily than in the state where the object detection pattern I3 is not projected onto the object 7.

It is desirable that the object 7 is a retroreflective member. In this case, a part reflected off the object 7, of the object detection pattern I3 projected from the projector 1, heads toward the projector 1. Therefore, the object 7 can be detected even more easily than in the state where the object detection pattern I3 is not projected onto the object 7.

The projection unit 104 may project the projection position detection pattern I2 for detecting the projection position, onto the projection surface 5a.

The projection position detection unit 43 detects the projection position of the projection position detection pattern I2, based on picked-up image information generated by the image pickup unit 106 picking up an image of the projection surface 5a where the projection unit 104 projects the projection position detection pattern I2.

When the projection position of the projection position detection pattern I2 is not detected, the projection control unit 41 may reduce the brightness of the projection image P to lower than the brightness of the projection image P when the projection position of the projection position detection pattern I2 is detected. When the projection position of the projection position detection pattern I2 is not detected, the projection control unit 41 may stop the projection of the projection image P.

In this case, for example, when the projection position of the projection position detection pattern I2 is not detected because a part of the projection image P is out of the projection area 8, the projection image can be darkened.

The coordinate adjustment unit 44 establishes a correspondence between the camera coordinate system on the picked-up image and the liquid crystal panel coordinate system on the projection image, using the projection position of the projection position detection pattern I2.

In this case, the projection position detection pattern I2 for establishing a correspondence between the camera coordinate system on the picked-up image and the liquid crystal panel coordinate system on the projection image can also be used as a pattern for adjusting the brightness of the projection image. Therefore, the number of required patterns can be made smaller than when a dedicated pattern for adjusting the brightness of the projection image is used.

The projection control unit 41 causes the projection unit 104 to project the guide image I1 and thus prompts the user to adjust the positional relation between the object 7 and the first area I11.

Thus, the user can adjust the position of the projector 1 in such a way that the projection image P is maintained within the projection area 8 even when the distortion of the projection image P is corrected.

The first object 7a and the second object 7b may be arranged on the projection surface 5a. The projection area 8 may be defined based on the positions of the first object 7a and the second object 7b.

In this case, the user can adjust the positional relation between the position of the projector 1 and the projection area 8, using the first object 7a and the second object 7b.

The guide image I1 may also show the first message M1 prompting the user to adjust the position of the guide image I1 in such a way that the first object 7a, the second object 7b, the third object 7c, and the fourth object 7d are located in the first area I11.

In this case, the user can be better prompted to adjust the positional relation between the object 7 and the first area I11 than in a configuration where the first message M1 is not shown.

The projection control unit 41 may cause the projection unit 104 to project the projection position detection pattern I2 after projecting the guide image I1. The projection position detection pattern I2 is an example of a predetermined pattern. The guide image I1 may also show the second area I12 where the projection position detection pattern I2 is projected.

In this case, as the user adjusts the position of the second area I12 on the projection surface 5a, the projection position detection pattern I2 can be projected in a planned area.

The guide image I1 may also show the second message M2 prompting the user to adjust the position of the guide image I1 in such a way that the second area I12 is located within the projection area 8.

In this case, the user can be better prompted to adjust the position of the second area I12 than in the configuration where the second message M2 is not shown.

B: Modification Examples

For example, various modifications as described below can be made to the foregoing embodiment. Also, one or a plurality of modifications arbitrarily selected from among the following modifications can be combined together according to need.

Modification Example 1

In the first embodiment, the projection control unit 41 may control whether to stop the projection of the projection image P or not, based on the result of the detection of the object 7. For example, the projection control unit 41 controls the turning on and off of the light source 11, based on the result of the detection of the object 7. Also, a mechanical shutter is provided between the liquid crystal light valve 12 and the projection system 13, and the projection control unit 41 controls the opening and closing of the shutter, based on the result of the detection of the object 7.

In this case, too, it can be made less perceptible that a part of the projection image P is out of the projection area 8.

Modification Example 2

In modification example 1, when the result of the detection of the object 7 satisfies a condition that the object is not detected, the projection control unit 41 may stop the projection of the projection image P.

In this case, the stop of the projection of the projection image P can be controlled, according to whether the result of the detection of the object 7 reflecting that a part of the projection image P is out of the projection area 8 satisfies the first condition or not.

Modification Example 3

In the first embodiment, modification example 1 or modification example 2, a light-emitting member which itself emits light may be used as the object 7. The light-emitting member may be, for example, a member having a light source. The light source is, for example, an LED or light.

In this case, the object detection unit 45 detects the position of the object 7, for example, using the difference between picked-up image information generated when the object 7 emits light and picked-up image information generated when the object 7 does not emit light. The same projection image may be projected from the projection unit 104 when these two pieces of picked-up image information are generated.

The image pickup control unit 42 may cause the image pickup unit 106 to pick up an image of the projection surface 5a when the projection unit 104 projects a keystone-corrected projection image onto the projection surface 5a, for example, as shown in FIG. 15. The image pickup unit 106 picks up an image of the projection surface 5a where the keystone-corrected projection image P is projected, and thus generates third picked-up image information.

The object detection unit 45 may detect the object 7, based on the third picked-up image information. In this case, since the object 7 emits light, the object detection unit 45 detects the object 7, based on the luminance in the picked-up image.

The projection control unit 41 may execute step S7 when the position of the object 7 defines the projection area 8 of which a part of the projection image P goes out, as shown in FIG. 15. The projection control unit 41 may also stop the projection of the projection image P when the position of the object 7 defines the projection area 8 of which a part of the projection image P goes out.

In this case, the processing of detecting the object 7 by projecting the object detection pattern I3 can be omitted. Thus, there is no need to store or generate the object detection pattern I3.

Modification Example 4

In the first embodiment and modification examples 1 to 3, the retroreflective member used as the object 7 may be retroreflective to visible light or may be retroreflective to invisible light such as infrared light.

When a retroreflective member which is retroreflective to visible light is used as the object 7, the object detection pattern I3 is formed by light including visible light.

When a retroreflective member which is retroreflective to invisible light is used as the object 7, the object detection pattern I3 is formed by light including invisible light.

Modification Example 5

In the first embodiment and modification examples 1 to 4, the object 7 may have a different light reflection characteristic from the projection surface 5a. Therefore, for example, when the projection surface 5a is white, a member which absorbs light, for example, a black member, may be used as the object 7. In this case, the object detection unit 45 detects an area having a lower luminance than its surroundings in the picked-up image, as an object presence area where the object 7 is present.

Also, when the object 7 is configured to be changeable in reflection characteristic by switching the reflection surface itself or by changing the optical filter, the object 7 can be easily detected on various projection surfaces 5a. In this case, when the object 7 has a receiving unit which receives a control signal via wireless communication and a change unit which changes the reflection characteristic based on the control signal, the user can change the reflection characteristic via a remote control operation. Also, the object 7 may automatically change the reflection characteristic by having the projector 1 transmitting, to the object 7, a control signal based on the picked-up image by the image pickup unit 106.

Modification Example 6

In the first embodiment and modification examples 1 to 5, the positions of the four objects 7 are not limited to the four corners of the projection surface 5a and can be changed according to need. For example, the positions of the four objects 7 may be further on the inner side than the corners of the projection surface 5a.

Modification Example 7

In the first embodiment and modification examples 1 to 6, the number of objects 7 is not limited to four and may be any number equal to or greater than one. Also, objects including a plurality of objects 7 may be used.

Figure 19:
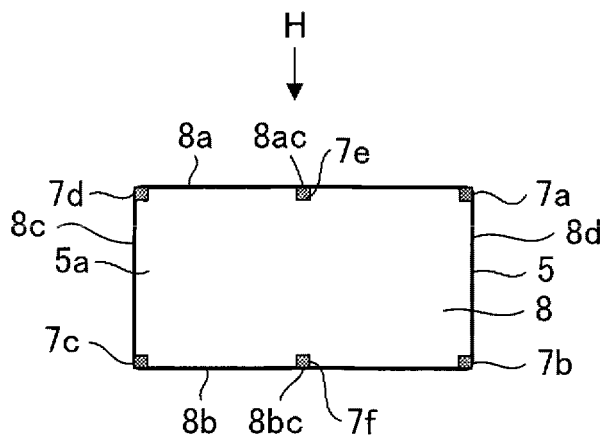
FIG. 19 shows another example of an object.
Figure 20:
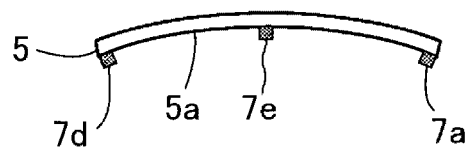
FIG. 20 shows the illustration of FIG. 19 as viewed from H-direction.

For example, when a fifth object 7e and a sixth object 7f are used in addition to the first object 7a, the second object 7b, the third object 7c, and the fourth object 7d, as shown in FIG. 19, the number of objects 7 is six. The fifth object 7e is located at a center 8ac of atop side 8a of the projection area 8. The top side 8a is an example of one of opposite sides of the projection area 8. The sixth object 7f is located at a center 8bc of a bottom side 8b of the projection area 8. The bottom side 8b is an example of the other of the opposite sides of the projection area 8. FIG. 20 shows the projection board 5 shown in FIG. 19, as viewed from the side of an arrow H. As shown in FIG. 20, the projection surface 5a shown in FIG. 19 is curved to be concave toward the center 8ac and the center 8bc. When five or more objects 7 are used as in this example, the shape of the projection area 8 can be other than quadrilateral. The one of opposite sides of the projection area 8 may be a left side 8c of the projection area 8. In this case, the other of the opposite sides of the projection area 8 is a right side 8d of the projection area 8.

Figure 21:
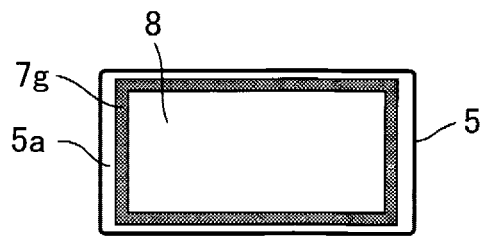
FIG. 21 shows another example of the object.

Meanwhile, when a seventh object 7g surrounding the rectangular projection area 8 is used, as shown in FIG. 21, the number of objects 7 may be one. In this case, the user adjusts one or both of the position of the guide image I1 and the position of the seventh object 7g in such a way that each of the four corners of the seventh object 7g is located in the first area I11 in the guide image I1.

Figure 22:
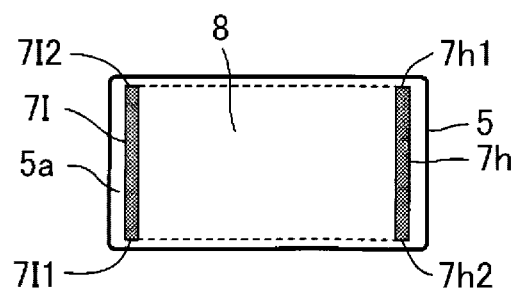
FIG. 22 shows another example of the object.

When a linear eighth object 7h defining the right side of the projection area 8 and a linear ninth object 7I defining the left side of the projection area 8 are used, as shown in FIG. 22, the number of objects 7 may be two. In this case, the user adjusts one or both of the position of the guide image I1, and the position of the eighth object 7h and the position of the ninth object 7I, in such a way that one end 7h1 of the eighth object 7h is located in the top right area I1a, the other end 7h2 of the eighth object 7h is located in the bottom right area I1b, one end 7I1 of the ninth object 7I is located in the bottom left area I1c, and the other end 7I2 of the ninth object 7I is located in the top left area I1d. Since the projection area 8 can be set based on the two objects 7, the setting of the projection area 8 is easier than, for example, when four objects 7 are used to set the projection area 8.

Modification Example 8

In the first embodiment and modification examples 1 to 7, the entirety or a part of the first message M1 and the second message M2 may be omitted from the guide image I1. Also, the second area I12 may be omitted along with the second message M2 from the guide image I1.

Modification Example 9

In the first embodiment and modification examples 1 to 8, the range of the first area I11 may be a movement range where the four corners of the projection image P can move in response to the execution of keystone correction by the distortion correction unit 102b, or a range included in the movement range.

Modification Example 10

In the first embodiment and modification examples 1 to 9, when the projection position detection pattern I2 is formed by invisible light such as infrared light, the second area I12 and the second message M2 are omitted from the guide image I1. When the projection position detection pattern I2 is formed by invisible light such as infrared light, the user does not recognize the projection position detection pattern I2. Therefore, step S3 can be executed without the user noticing.

When the object detection pattern I3 is formed by invisible light such as infrared light, the user does not recognize the object detection pattern I3. Therefore, step S9 can be executed without the user noticing.

Modification Example 11

In the first embodiment and modification examples 1 to 10, a surface that can move like an elevator door may be used as the projection surface 5a. In this case, for example, when the elevator door where the object 7 is located opens, the projection image can be darkened or the projection of the projection image can be stopped.

Modification Example 12

In the first embodiment and modification examples 1 to 11, the object 7 may be fixed to the projection surface 5a by magnetic force or an adhesive member. The method for fixing the object 7 to the projection surface 5a can be changed according to need.

Modification Example 13

In the first embodiment and modification examples 1 to 12, when image information is stored in the storage unit 107, the image combining unit 102a may use the image information stored in the storage unit 107 instead of the received image information.

Modification Example 14

In the first embodiment and modification examples 1 to 13, all or apart of the elements implemented by the control unit 108 executing a program may be implemented by hardware such as an electronic circuit or may be implemented by a collaboration of software and hardware. The electronic circuit is, for example, an FPGA (field-programmable gate array) or ASIC (application-specific IC).

Modification Example 15

In the first embodiment and modification examples 1 to 14, the projection unit 104 uses a liquid crystal light valve as a light modulation device. However, the light modulation device is not limited to a liquid crystal light valve and can be changed according to need. For example, the light modulation device may be configured using three reflection-type liquid crystal panels. Also, the light modulation device may be configured by a combination of one liquid crystal panel and a color wheel, by using three digital mirror devices, or by a combination of one digital mirror device and a color wheel, or the like. When only one liquid crystal panel or digital mirror device is used as the light modulation device, members equivalent to the color separation system and the light combining system are not needed. Also, other than the liquid crystal panel and the digital mirror device, any configuration that can modulate light emitted from a light source can be employed as the light modulation device.

Modification Example 16

In the first embodiment and modification examples 1 to 15, the coordinate adjustment unit 44 may divide the projection surface 5a into a plurality of sub-areas and generate a homography matrix for every sub-area, instead of generating one homography matrix for the entirety of the projection surface 5a. In this case, the projection position detection pattern I2 is projected in every sub-area, and a homography matrix for the sub-area is generated, based on a picked-up image of the projection position detection pattern I2.

Modification Example 17

In the first embodiment and modification examples 1 to 16, step S7 may be omitted.

What is claimed is:

1. A projector comprising:
a projection unit projecting a projection image onto a projection surface where an object is located, the object defining a projection area where the projection image should be projected;
a distortion correction unit correcting a distortion of the projection image; and
a projection control unit causing the projection unit to project a guide image showing a range within which a predetermined site of the projection image can move according to the correction of the distortion; wherein
the predetermined site includes four corners of the projection image,
the guide image includes:
an area which represents the range within which the four corners of the projection image can move according to the correction of the distortion, and
a background area which is different from the area;
the area has a first color, and
the background area has a second color which is different from the first color.

2. The projector according to claim 1, wherein
the guide image includes a message prompting a user to adjust a positional relation between the object and the range.

3. The projector according to claim 1, wherein
the predetermined site includes four corners of the projection image,
the object includes a first object, a second object, a third object, and a fourth object,
at least the first object, the second object, the third object, and the fourth object are arranged on the projection surface, and
four corners of the projection area are defined based on positions of the first object, the second object, the third object, and the fourth object.

4. The projector according to claim 1, wherein
the predetermined site includes four corners of the projection image,
the object includes a first object, a second object, a third object, a fourth object, a fifth object, and a sixth object,
on the projection surface, the first object, the second object, the third object, and the fourth object are arranged corresponding to the four corners, and the fifth object and the sixth object are arranged at positions not corresponding to the four corners,
the projection area is defined based on positions of the first object, the second object, the third object, the fourth object, the fifth object, and the sixth object,
a center of one of opposite sides of the projection area is defined based on the fifth object, and
a center of the other of the opposite sides of the projection area is defined based on the sixth object.

5. The projector according to claim 3, wherein
the guide image further shows a first message prompting adjustment of at least one of a position of the guide image, the first object, the second object, the third object, and the fourth object in such a way that the first object, the second object, the third object, and the fourth object are located within the range.

6. The projector according to claim 1, wherein
the projection control unit causes the projection unit to project a predetermined pattern after projecting the guide image, and
the guide image further shows an area where the predetermined pattern is projected.

7. The projector according to claim 6, wherein
the guide image further shows a second message prompting adjustment of one or both of a position of the guide image and the object in such a way that the area where the predetermined pattern is projected is located in the projection area.

8. The projector according to claim 1, wherein
the object includes a seventh object surrounding the projection area,
the seventh object is arranged on the projection surface, and
the projection area is defined based on a position of the seventh object.

9. The projector according to claim 1, wherein
the object includes a linear eighth object defining a right side of the projection area and a linear ninth object defining a left side of the projection area,
the eighth object and the ninth object are arranged on the projection surface, and
the projection area is defined based on positions of the eighth object and the ninth object.

10. A method for controlling a projector, the method comprising:
projecting a projection image onto a projection surface where an object is located, the object defining a projection area where the projection image should be projected; and
projecting a guide image showing a range within which a predetermined site of the projection image can move according to correction of a distortion of the projection image;
wherein
the predetermined site includes four corners of the projection image,
the guide image includes:
an area which represents the range within which the four corners of the projection image can move according to the correction of the distortion, and
a background area which is different from the area;
the area has a first color, and
the background area has a second color which is different from the first color.

11. The method for controlling the projector according to claim 10, wherein
the guide image includes a message prompting a user to adjust a positional relation between the object and the range.

12. The method for controlling the projector according to claim 10, wherein
the predetermined site includes four corners of the projection image,
the object includes a first object, a second object, a third object, and a fourth object,
at least the first object, the second object, the third object, and the fourth object are arranged on the projection surface, and
four corners of the projection area are defined based on positions of the first object, the second object, the third object, and the fourth object.

13. The method for controlling the projector according to claim 10, wherein
the predetermined site includes four corners of the projection image,
the object includes a first object, a second object, a third object, a fourth object, a fifth object, and a sixth object,
on the projection surface, the first object, the second object, the third object, and the fourth object are arranged corresponding to the four corners, and the fifth object and the sixth object are arranged at positions not corresponding to the four corners, the projection area is defined based on positions of the first object, the second object, the third object, the fourth object, the fifth object, and the sixth object, a center of one of opposite sides of the projection area is defined based on the fifth object, and a center of the other of the opposite sides of the projection area is defined based on the sixth object.

14. The method for controlling the projector according to claim 12, wherein the guide image further shows a first message prompting adjustment of at least one of a position of the guide image, the first object, the second object, the third object, and the fourth object in such a way that the first object, the second object, the third object, and the fourth object are located within the range.

15. The method for controlling the projector according to claim 10, wherein a predetermined pattern is projected after projecting the guide image, and the guide image further shows an area where the predetermined pattern is projected.

16. The method for controlling the projector according to claim 15, wherein the guide image further shows a second message prompting adjustment of one or both of a position of the guide image and the object in such a way that the area where the predetermined pattern is projected is located in the projection area.

17. The method for controlling the projector according to claim 10, wherein the object includes a seventh object surrounding the projection area, the seventh object is arranged on the projection surface, and the projection area is defined based on a position of the seventh object.

18. The method for controlling the projector according to claim 10, wherein the object includes a linear eighth object defining a right side of the projection area and a linear ninth object defining a left side of the projection area, the eighth object and the ninth object are arranged on the projection surface, and the projection area is defined based on positions of the eighth object and the ninth object.

* * * * *